United States Patent [19]

Dziuba et al.

[11] 4,407,382
[45] Oct. 4, 1983

[54] WHEEL HEAD FOR DRIVING WHEELS OF VEHICLES

[75] Inventors: Peter Dziuba, Ueberlingen; Manfred Goeft, Friedrichshafen, both of Fed. Rep. of Germany

[73] Assignee: Zahnradfabrik Friedrichshafen, Aktiengesellschaft, Friedrichshafen, Fed. Rep. of Germany

[21] Appl. No.: 249,715

[22] Filed: Mar. 31, 1981

[30] Foreign Application Priority Data

Apr. 5, 1980 [DE] Fed. Rep. of Germany ....... 3013431

[51] Int. Cl.³ .............................................. B62D 55/00
[52] U.S. Cl. ..................................... 180/10; 188/71.5; 188/366
[58] Field of Search .................... 180/10; 74/391, 394; 188/71.5, 366

[56] References Cited

U.S. PATENT DOCUMENTS

| | | | |
|---|---|---|---|
| 1,403,658 | 1/1922 | Zweigbergk | 74/785 |
| 3,095,762 | 7/1963 | Baker | 74/720.5 |
| 3,115,204 | 12/1963 | Dence | 180/10 |
| 3,150,532 | 9/1964 | Bixby | 74/391 |
| 3,184,994 | 5/1965 | Stahl | 180/10 |
| 3,439,766 | 4/1969 | Dence et al. | 180/308 |
| 3,754,625 | 8/1973 | Voth et al. | 192/4 A |
| 4,010,830 | 3/1977 | Logus et al. | 188/71.5 |
| 4,037,694 | 7/1977 | Keese | 188/71.5 |
| 4,142,615 | 3/1979 | Sidles, Jr. et al. | 188/71.5 |
| 4,317,498 | 3/1982 | Jirousek et al. | 188/71.5 |

FOREIGN PATENT DOCUMENTS

| | | |
|---|---|---|
| 1480002 | 6/1971 | Fed. Rep. of Germany . |
| 1371016 | 10/1974 | United Kingdom . |
| 1434845 | 5/1976 | United Kingdom . |

*Primary Examiner*—Joseph F. Peters, Jr.
*Assistant Examiner*—Ross Weaver
*Attorney, Agent, or Firm*—Karl F. Ross; Herbert Dubno

[57] ABSTRACT

A wheel head for the drive wheel of a heavy duty vehicle provides the hub as a housing which is closed at its outer end by a movable cover and can be opened to allow removal of the planetary gearing and brake. The planetary gearing includes planetary gears journaled directly on the cover and a ring gear in the form of a hollow shaft which encloses the brake and is connected to the axle by a wheel bearing cap which also can be removed through the housing opening when the cover is detached.

6 Claims, 2 Drawing Figures

WHEEL HEAD FOR DRIVING WHEELS OF VEHICLES

FIELD OF THE INVENTION

The subject of the invention is a final drive for vehicles which incorporates an additional reducing gear in the wheel-head housing between a pressure-medium-operated wheel-hub multi-disc brake running in oil and the wheel body.

BACKGROUND OF THE INVENTION

According to the prior art (e.g. DE-OS No. 23 28 929) a planetary final drive and a brake disc are arranged in a hub housing in a common oil bath, whereby the brake disc, which is pressure-medium operated, is supported, on the one hand, against a non-rotatable annular gear assembly protruding from a hollow axle in the wheel hub housing and on the other hand, against a free end of the driving shaft provided with a sun wheel.

It is also known (e.g. according to DE-OS No. 27 26 687) to provide a brake arranged between driving shaft and final drive as multi-disc brake, which is supported axially against a ring firmly connected with the rotating wheels. These known arrangements suffer from various disadvantages if applied in practice, in particular when used in the heaviest vehicles with large individually driven wheels.

To gain access to the brakes and the brake cylinder it is either necessary to jack up the vehicle and unscrew the wheel or to release several flange connections and dismantle the planetary gearing.

Also, the brake cylinder which in both cases is not protected from the intrusion of rubbings from the brake, cannot be removed without completely dismantling the wheel bearing, because it is an integral part of the inner bearing ring of the respective wheel bearing.

A further disadvantage is the considerable constructional length required, due to the use of individual tapered-roller bearings which are spaced far apart and a long threaded extension on the hollow axle protruding in the direction of the brake for fastening the wheel bearing cover. Considerable length is also needed due to the unfavorable fastening of the planet wheel carrier bolts and the additional flange seal to be placed in front of them.

The weight of the parts and their large dimensions as well as, in particular, the necessity to dismantle the wheels from the jacked-up vehicle in order to gain access to the brake, make it difficult for one man to service the vehicle.

The one-piece design of the hub housing as a planet wheel carrier also makes it difficult to design the final drive with different transmission ratios or hollow wheel diameters, but with the same wheel bearing, such as would be desirable for a wheel head in modular concept.

A disadvantage is further the lack of a certain spatial separation of the oil supplies for drive and brake so that, in an adverse situation, the gearing might be damaged not only by overheated oil, but possibly also by rubbings from the brake.

OBJECT OF THE INVENTION

It is therefore the object of the invention to provide a wheel head for a vehicle driving wheel which is more efficient, short, robust and easy-to service and wherein all parts of the wheel head directly up to the wheel bearing are easily and quickly accessible and dismountable and whereby the oil bath of the gearing section can be kept substantially separate from the oil circulation to the brake without the need for additional constructional length.

SUMMARY OF THE INVENTION

A wheel head for a driving wheel of a vehicle can additionally incorporate a reducing gear between a pressure-medium operated wheel hub disc brake running in oil and the wheel hub and this can comprise a hub housing which includes:

a wheel bearing with a preceding seal against a hub carrier fixed to the chassis, a hub carrier shaped as a hollow axle which surrounds a one-piece shaft on a drive side, a wheel bearing cap arranged in front of the wheel bearing on a driven side and shaped as a hollow wheel carrier attached with its face to the hollow axle, a brake operable from the hollow axle via pressure-medium connections with a cylinder and an annular piston axially pressable against an external brake disc, and return springs integrated in the hollow wheel carrier, the external driver of which meshes with displaceable external brake discs and with a hollow wheel of the planetary gearing, a housing cover serving as a planet wheel carrier with an axial thrust-limiting bearing in the center and arranged in front of the free end of the shaft and of the face of the housing, planet wheel carrier bolts which carry planet wheels meshing with a sun wheel toothing driven from the shaft and the internal toothing of the hollow wheel, and a supporting disc axially held between the planet wheels and brake.

According to the invention:

(a) The housing cover closes an opening in the face of the hub housing which is larger than the largest diameter of the external driver of the hollow wheel carrier.

(b) The housing cover comprises planet wheel carrier bolts which form an integral part and protrude freely from it on the inside.

(c) The planet wheel rotate directly in front of the inside wall of the housing cover and may be withdrawn as an assembly together with the latter from the internal toothing of the hollow wheel.

(d) The wheel bearing is a double tapered-roller bearing with a common outer bearing ring which is situated radially below the rim and is supported, with its inner bearing rings, directly against a flange collar of the hollow axle 20.

(e) The hollow wheel carrier is shaped as a wheel bearing cap and is screwed in front of the flange collar by means of fitted bolts axially engaging in the hollow axle inside the wheel bearing diameter and preferably surrounded by centering sleeves; this also seals the pressure-medium channel.

(f) On its circumference the hollow wheel carrier has a ring collar protruding towards the brake side, into which are worked the external driver for the hollow wheel in the form of external toothing and, on the inside, two stepped annular contact surfaces which together with the annular piston form a ring cylinder.

(g) The hollow wheel has an outer diameter which is smaller than the clearance which the housing cover provides, and a continuous inner toothing which is engaged by the external drive of the hollow wheel carrier, external brake discs and planet wheels; the hollow wheel is held detachably in axial and in rotating direction.

The advantages of the invention are, in particular, seen in the fact that due to the integral design of the planet wheel carrier with the housing cover and its enlargement beyond the largest diameter of the external dimensions of the hollow wheel carrier, not only the set of planetary gears can be withdrawn as an assembly together with the housing cover itself out of the hollow wheel or from the sun wheel, but the subsequently arranged parts in the housing can be removed independently from the wheel bearing, because all parts supported against the chassis are retained in the same continuous hollow toothing.

The integral design of the planet wheel carrier bolts with the housing cover considerably reduces the structure length, eliminates difficulties caused by dimensional faults and the necessity for a large housing seal.

The structure of the invention makes it possible to transfer the wheel load via a rolling bearing, which is very short in length and supported only in the hollow axle itself, without intermediate elements directly to the hollow axle reinforced by the flange collar.

The fact that the wheel bearing cap forms simultaneously a hollow wheel carrier and is fastened independently from the inner bearing ring by means of fitted bolts/centering sleeves arranged below the wheel bearing, again contributes to a reduction in constructional length and easy dismantling of the hollow wheel carrier with integrally formed annular cylinder, if required.

It is thus possible, without altering the wheel bearing, to use different annular cylinders and hollow wheel dimensions in the same hub housing, while the wheel remains in the assembled position or without having to jack up the vehicle.

By flange-mounting the wheel bearing cap or the hollow wheel carrier to the flange collar of the hollow axle and simultaneously sealing the pressure-medium channel in the wall of the hollow axle or the hollow wheel carrier, a more reliable seal is achieved than was possible so far with the two sleeve rings arranged one behind the other. The hollow axle design according to the invention eliminates the need for costly splines with preceding thread on the hollow axle as known from the prior art. Machining becomes considerably simpler and the wheel bearing cap can be assembled/removed with normal tools.

It is also possible to give the annular piston the largest possible effective diameter. Furthermore, with the design of the hollow wheel carrier as per the invention, the annular piston contact surfaces can be arranged solely on the inside walls of the protruding ring collar in such a way as to achieve not only a simpler manufacture, but also a more reliable sealing effect of the piston rings. The small filling volume of the annular cylinder for a large effective surface on the ring cross section also leads to a fast response in operation. Co-ordinating the hollow wheel diameter with the clearance cross section of the housing flange opens, for the first time, the possibility of removing the hollow wheel carrier together with the hollow wheel without having to remove the hub housing, or the wheel or as to jack up the vehicle.

According to a feature of the invention the annular piston has only external sealing surfaces into which the annular piston rings are inserted. On its side facing the brake the annular piston has a pressure surface which is enlarged toward the center of the axle and shaped in the form of a ring collar and which may brought into contact with the external brake disc retained by the hollow wheel by pressure-medium pressure in the annular cylinder and taken out of contact via return springs between annular piston and hollow wheel carrier, when the pressure medium leaves, and the annular cylinder has a pressure-medium connection leaving the ring collar of hollow wheel carrier coaxially to the shaft.

This makes it possible to distribute the pressing effect from the annular piston over a large pressure surface radially to the brake discs and to simultaneously substantially protect the annular piston contact surfaces by the same pressure surface against the cooling oil which may sometimes be contaminated with rubbings from the brakes. Furthermore the return springs for the annular piston may be favorably assembled in the ring collar of the pressure surface without additional structural length and without coming into contact with the annular cylinder space.

In order to achieve braking for a large difference in revolutions, the supporting disc is nonrotatable with the hollow wheel and is associated, on the brake side, with an internal brake disc rotating with the shaft.

In order to achieve braking for a smaller difference in revolutions, the supporting disc rotates with the planet wheel carrier bolts and is associated, on the brake side, with an internal brake disc rotating with the shaft.

For makes it possible to achieve braking for a much smaller difference in revolutions, the supporting disc rotates with the planet wheel carrier bolts and is associated, on the brake side, with an external brake disc nonrotatable with the hollow wheel.

Combinations of the three brake disc arrangements as given above are, of course, possible without deviating from the invention.

According to another feature of the invention the supporting disc is itself or together with an associated brake disc, shaped as a partition between planetary gearing and brake and there is a lubricant supply for the planetary gearing which is separate from the cooling oil circuit of the brake.

In yet another feature of the invention the flange collar has distance pieces (spacers) in the annular clearance between the hollow axle and the shaft, which during dismantling of the parts in the hub housing meshing with the wheel bearing cover counteract an eccentric displacement of the shaft. The distance pieces or spacers have openings for the brake coolant contained in the annular clearance. The hub housing has a filler and drain connection preferably in the immediate area of the rim flange and protruding from it.

This makes it possible for the supporting disc to ensure in multiple function that cooling of the brakes is separated from lubrication of the gears. In case of the destruction the brake through excessive loads or if the brake run dry, there is emergency lubrication of the gears thus preventing damage of them for quite a while.

This arrangement allows the use of longer drive shafts, as may occur in wide gauge vehicles, and ensures that they are not displaced undesirably far from the center during withdrawal of the housing cover or the planetary gearing and the hollow wheel carrier with its array of brake discs and supporting discs. The spacers, without further aids, ensure that the brake and gearing components can be replaced without being hindered by an inadmissibly far, eccentrically displaced drive shaft. Care has been taken that the distance and the drive will loose contact with each other during threading of the brakes and the gearing parts into the hollow wheel.

BRIEF DESCRIPTION OF THE DRAWINGS

The essential details of the invention will now be described with reference to the accompanying drawing in which.

SPECIFIC DESCRIPTION

Figure 1:
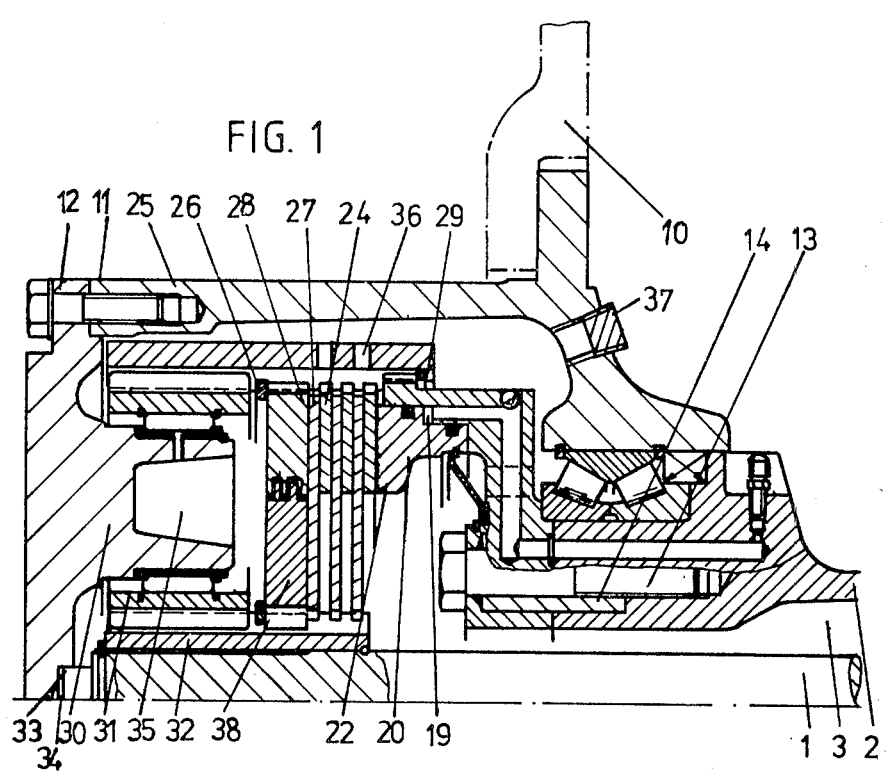
FIG. 1 is a diagrammatic partial axial section illustrating the principal design of the wheel head, the brake being identified by a supporting disc which is non-rotatable with the hollow wheel and is associated with an internal brake disc.

In FIG. 1 the driven shaft 1 passes through the stationary hollow axle 2 connected with the chassis of the vehicle, with an annular clearance 3 which is of ample dimensions for holding and circulating the coolant. The hollow axle terminates in a flange collar 4 onto which is mounted the wheel bearing 5 and its seal 6. Rotating on wheel bearing 5 is a wheel hub 7 which forms an integral part with the hub housing 8 and the rim flange 9 in such a way that the power flux is able to flow from the wheel via the rim 10 without any major deviations directly via the wheel bearing 5 to the hollow axle 2 or to the chassis without any major loads being transferred to the brake or the gearbox. The wheel bearing in turn, can be largely safeguarded against the heat emitted from a hot brake. At the front end the hub housing 8 terminates in a hub flange 11 to which may be attached the housing cover 12 using a single cover seal. The brake and the reducing gear are arranged coaxially to the shaft inside the hub housing 8 between flange collar 4 and the housing cover 12 and are attached on the drive side to the hollow axle 2 via fitted bolts 13 or centering sleeves 14. The pressure-medium supply 15 inside the hollow axle 2 includes a supply channel passing via a simple seal on the face into the flange designed as wheel bearing cap and also as hollow wheel carrier 16. This wheel bearing cap 16 therefore has several functions in that it has to act as support for the lateral forces from the wheel bearing 5 as well as for the torques of the drive. It is therefore of advantage that these stability loads can be absorbed via a reliable connection formed by a large number of individual fitted bolts 13 and centering sleeves 14. The hollow wheel carrier 16 has a ring collar 17 protruding on the brake side with external drivers 18 shaped preferably as external gearing and with two stepped cylindrical surfaces on the inside. The hollow wheel carrier 16 contains furthermore the continuation of the link channel for the pressure-medium supply 15 which opens into the annular cylinder 19 formed by the cylinder contact surfaces on the inside of the ring collar 17 together with the annular piston 20. The annular piston 20 also has two stepped cylinder contact surfaces which are, however, arranged on the outside of the annular piston 20 and can accept slipped-over piston rings 21 in corresponding grooves from outside. The annular piston 20 has a wide annular collar 22 protruding towards the inside in the direction of shaft 1 and having a contact surface on the brake side.

This annular collar 22 is provided with coaxial bores on a circumference which is smaller than the annular piston 20 and which opposes corresponding bores on the same circumference in the hollow wheel carrier 16. These bores can hold return springs 23 in such a way that they neither touch the annular cylinder chamber 19 nor require additional constructional length beyond the dimension of the annular piston 20 and the hollow wheel carrier 16 surrounding it.

If the number of brake discs in small, cup springs (FIG. 1) instead of screw springs can be supported in annular grooves between annular piston and hollow wheel carrier, which would eliminate the need for the bores.

Opposite the contact surface of the annular piston 20, on the brake side, is an external brake disc 24 which is retained in the hollow wheel 25 or its internal toothing. The brake itself may consist of several pairs of brake discs. With this arrangement on external brake disc 24 detachably retained in the internal toothing of the hollow wheel 25 attached to the hollow wheel carrier via an axial fixing 26, alternates with an internal brake disc 27. The last internal brake disc 27 of the corresponding brake assembly can be made to touch a supporting disc 28 through annular piston 20 by means of corresponding pressure-medium pressure and compression of the other brake discs arranged in front.

With the example according to FIG. 1 this supporting disc is non-rotatably arranged with the internal toothing of the hollow wheel 25 and has a fastening 29, preferably in the form of a retaining ring, arranged in the internal toothing which will prevent it from being pressed against the planet wheel carrier bolts 30. These planet wheel carrier bolts 30 which are directly formed onto the housing cover 12, i.e. are integral with and protrude from it, serve to carry the rotating planetary gears 31. They mesh not only with the internal toothing of the hollow wheel 25 but also with the sun wheel 32 on the shaft 1.

The sun wheel 32 may, according to requirements and dimensions, be worked directly out of the shaft 1 or may be designed as a gear non-rotatably attached and pushed onto to it.

The shaft 1 ends on the inside of the housing cover 12 with an axial support bearing 33 and is also guided radially in a corresponding recess by means of spacers 34. The cavities 35 which are formed in the center of planet wheel carrier bolts 30 can be, if they are sufficiently large, advantageously used to house lubricants which may leave the bolts via small radial bores to enter the planet wheel bearings should these run dry. In cases of high loads on the brakes the invention provides for radial opening 36 to be arranged on the circumference of the hollow gear 25 roughly in the area of the brake assembly 24, 27 through which rubbings may be rinsed away behind the hollow wheel to the outside into the free space of the hub housing. From here it may be easily drained during occasional service through the filler and drain connection 37 preferably arranged in a calmed flow area in the vicinity of the hub flange 11, by opening drain plugs 37. In cases where rubbings constitute a special danger the area containing the gears may be further separated from the brake, according to the invention, by an inner partition disc corresponding to the supporting ring 28 and overlapping with it via a labyrinth seal, and which is being non-rotatably and axially held in the external toothing of the sun wheel 32 in the same way as the supporting disc 28 by a fastening element 29. According to requirement a completely separate lubrication system for the planetary gearing may then be provided or alternatively link bores may be provided in the shaft for the supply of fresh oil which will ensure reliable lubrication of the gears despite the separation.

Figure 2:
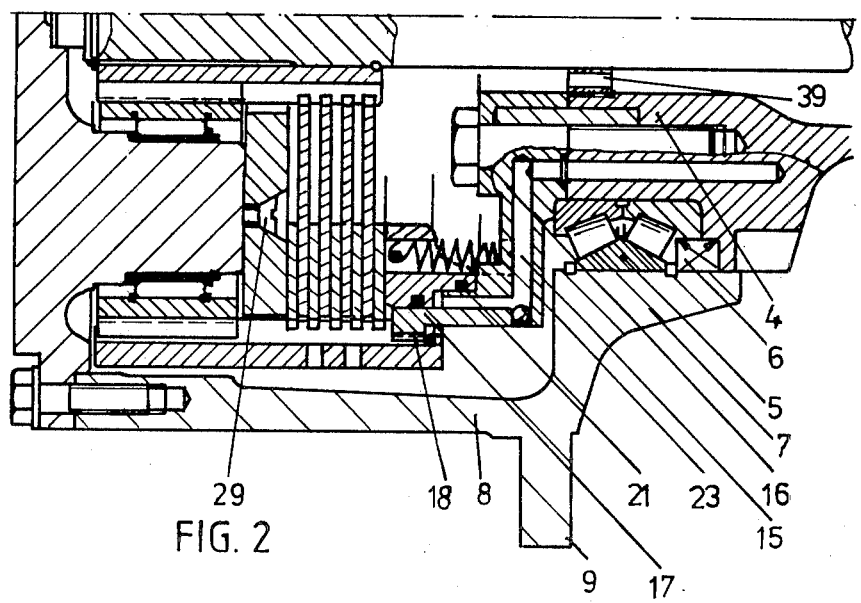
FIG. 2 is a similar view of a brake where the supporting disc is attached to the planet wheel carrier bolts and, on the brake side, is associated with an internal brake disc.

In FIG. 2 the same housing principle has been illustrated, but with the difference that the supporting disc 28 is attached by fastenings 29 to the planet wheel carrier bolts 30 and is rotating with these. Illustrated is the supporting disc 28 paired in friction with an external brake disc 24, it can, however, also be paired in friction with an internal brake disc 27. Combinations of these arrangements may also be considered which become possible under the invention, advantageously using the same hollow wheel arrangement principle.

With this construction according to the invention the procedure for dismantling the wheel head would be as follows:

The wheel is brought into a position, where the oil drain plug 37 is pointing downwards, and is then secured against rolling forward by a brake shoe. When the oil is drained, the housing flange 16 may be opened and withdrawn to the front together with the planetary gears directly attached to it. With the embodiment according to FIG. 1 fastening 29 (retaining ring) must be released first and supporting disc 28 must also be withdrawn to the front. Since the distance pieces 39 in the annular clearance 3 substantially prevent a displacement of the shaft 1 away from the center of the axis, the supporting disc 28 may now be withdrawn to the front without problems along the hollow wheel toothing 25 or the sun wheel toothing 32.

With the embodiment as per FIG. 2 no fastening 29 (retaining ring) need be removed after opening. For with this arrangement the supporting disc 28 remains on the planet wheel carrier bolt 30 and free access to the brake is obtained immediately after removing the housing cover flange 12.

If apart from the brake discs 24, 27 the hollow wheel 25 is to be removed, its axial fixing 26 has to be released first. If this fastening is shaped in the form of a retaining ring which is retained in a slot behind the external toothing of the hollow wheel carrier 16, removal of the fitted bolts 13 from the flange collar 4 is recommended; then the entire hollow wheel carrier 16, including the annular piston 20 in it and the return springs 23, may easily be pulled forward as a complete assembly and withdrawn from the hub housing 8. Now the component parts, as well as the wheel bearing are open to inspection and spare parts or correspondingly dimensioned exchange parts for other transmission ratios or brake ratings can be placed into the same hub housing.

The advantages achieved with the design according to the invention—in particular as regards easy access to the brakes and shorter constructional length of the wheel bearing—may of course, also be applied to wheel drives with single brake discs or to those where, instead of a shaft with a sunwheel attached to it, a single drive motor with correspondingly rotating external toothing is used, or where the hollow wheel is supported against a spur gear, or where the hollow wheel is merely the external brake disc carrier.

We claim:

1. A wheel head for a driven wheel of a vehicle comprising:
    a hollow nonrotatable axle having a free end;
    a wheel bearing mounted on said free end of said axle;
    a wheel hub journaled on said wheel bearng and having an annular housing member extending axially therefrom and projecting outwardly beyond said end, said housing member enclosing a space opening at an extremity of said housing member remote from said axle, said hub being adapted to receive a vehicle wheel for supporting same substantially in the plane of said wheel bearing;
    a cover detachably affixed to said housing member at said extremity for enclosing said space and affording access thereto upon removal of said cover, said cover being formed unitarily and in one piece with at least one journal bolt;
    a drive shaft extending through said axle and terminating in said space;
    speed-reducing planetary gearing in said space connecting said drive shaft to said hub for rotating same, said planetary gearing including:
        a sun gear on said shaft,
        at least one planetary gear meshing with said sun gear and journaled on said bolt, and
        a ring gear meshing with said planet gear, and said ring gear being dimensioned to be withdrawn from said space through said extremity upon removal of said cover;
    a wheel bearing cap detachably affixed to said end of said axle in said space axially outwardly of said wheel bearing and formed with an annular collar externally engaging said ring gear and angularly coupling same with said axle, said cap being dimensioned to enable withdrawal of said wheel bearing cap from said space upon the detachment thereof said axle; and
    a brake operated by a pressure medium disposed between said wheel bearing cap and said cover and of a diameter less than that of said ring gear for enabling withdrawal of said brake from said space through said extremity upon removal of said cover, said brake comprising:
        an annular piston mounted on said wheel bearing cap and disposed within said collar, said piston being axially displaceable upon pressurization of a chamber defined between said piston and said wheel bearing cap and supplied with fluid through a passage in said wheel bearing cap,
        a plurality of brake elements angularly coupled with said sun gear,
        a plurality of brake elements angularly coupled with said ring gear being interleaved within said ring gear, said piston having only external sealing surfaces receiving respective sealing rings, the piston further having a face extended inwardly from said collar for bearing against said elements,
        spring means braced between said piston and said wheel bearing cap for biasing said piston against the force developed by fluid pressure, and
        a support disc disposed within said ring gear between said elements and said cover,
        said support disc comprises an outer portion angularly connected with said ring gear and an inner portion constituting a piece separate from said outer portion and angularly connected to said sun gear, said portions being axially fixed to the respective gear.

2. A wheel head for a driven wheel for a vehicle comprising:
    a hollow nonrotatable axle having a free end;
    a wheel bearing mounted on said free end of said axle;

a wheel hub journaled on said wheel bearing and having an annular housing member extending axially therefrom and projecting outwardly beyond said end, said housing member enclosing a space opening at an extremity of said housing member remote from said axle, said hub being adapted to receive a vehicle wheel for supporting same substantially in the plane of said wheel bearing;

a cover detachably affixed to said housing at said extremity for enclosing said space and affording access thereto upon removal of said cover, said cover being formed unitarily and in one piece with at least one journal bolt;

a drive shaft extending through said axle and terminating in said space;

speed-reducing planetary gearing in said space connecting said drive shaft to said hub for rotating same, said planetary gearing including:
a sun gear on said shaft,
at least one planetary gear meshing with said sun gear and journaled on said bolt, and
a ring gear meshing with said planet gear, and said ring gear being dimensioned to be withdrawn from said space through said extremity upon removal of said cover;

a wheel bearing cap detachably affixed to said end of said axle in said space outwardly of said wheel bearing and formed with an annular collar externally engaging said ring gear and angularly coupling same with said axle, said cap being dimensioned to enable withdrawal of said wheel bearing cap from said space upon the detachment thereof from said axle; and a brake operated by a spressure medium disposed between said wheel bearing cap and said cover and of a diameter less than that of said ring gear for enabling withdrawal of said brake from said space through said extremity upon removal of said cover, said brake comprising:
an annular piston mounted on said wheel bearing cap and disposed within said collar, said piston being axially displaceable upon pressurization of a chamber defined between said piston and said wheel bearing cap and supplied with fluid through a passage in said wheel bearing cap,
a plurality of brake elements angularly coupled with said sun gear,
a plurality of brake elements angularly coupled with said ring gear, said brake elements of said sun gear and said ring gear being interleaved within said ring gear, said piston having only external sealing surfaces receiving respective sealing rings, the piston further having a face extended inwardly from said collar for bearing against said elements,
spring means braced between said piston and said wheel bearing cap for biasing said piston against the force developed by fluid pressure, and
a support disc disposed within said ring bear between said elements and said cover,
said support disc is connected to said cover.

3. The wheel head defined in claim 1, further comprising a labyrinth seal between said portions of said support disc.

4. The wheel head defined in claim 3 wherein said disc is formed as a partition between the planetary gear and the brake and the planetary gear is disposed in a lubricant supply compartment.

5. The wheel head defined in claim 1, further comprising spacers between said axle and said shaft at said end of said axle limiting offset of said shaft relative to said axle upon removal of said gearing and said brake from said spacers, said spacers being provided with openings adapted to be traversed by a coolant, said space being formed with a coolant drain opening in said hub which can be closed to retain coolant in said space.

6. The wheel head defined in claim 2, further comprising spacers between said axle and said shaft at said end of said axle limiting offset of said shaft relative to said axle upon removal of said gearing and said brake from said spacers, said spacers being provided with openings adapted to be traversed by a coolant, said space being formed with a coolant drain opening in said hub which can be closed to retain coolant in said space.

* * * * *